June 10, 1958 A. SAXER 2,837,943
CONTROL FOR TWO ORTHOGONAL FEED MOVEMENTS
Filed March 18, 1952 7 Sheets-Sheet 1

Inventor
August Saxer
By Robert E. Burns
Attorney

June 10, 1958  A. SAXER  2,837,943
CONTROL FOR TWO ORTHOGONAL FEED MOVEMENTS
Filed March 18, 1952  7 Sheets-Sheet 3
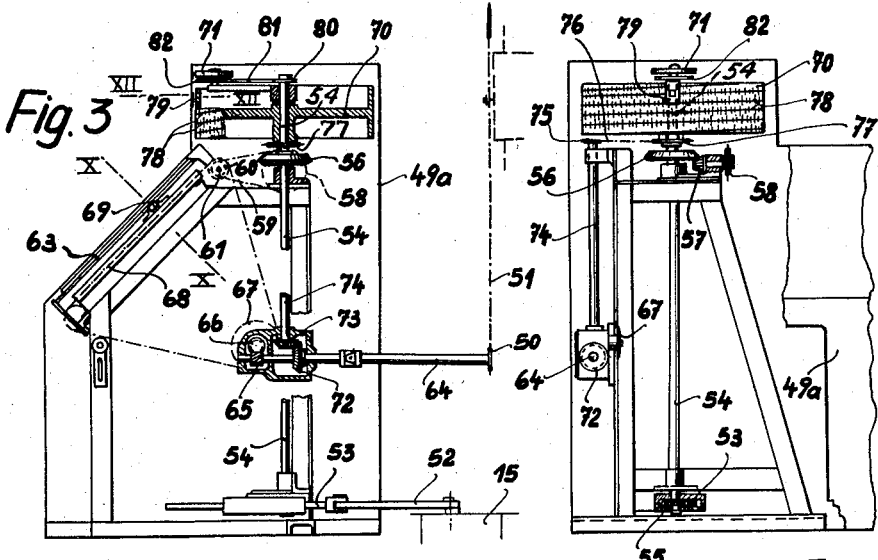
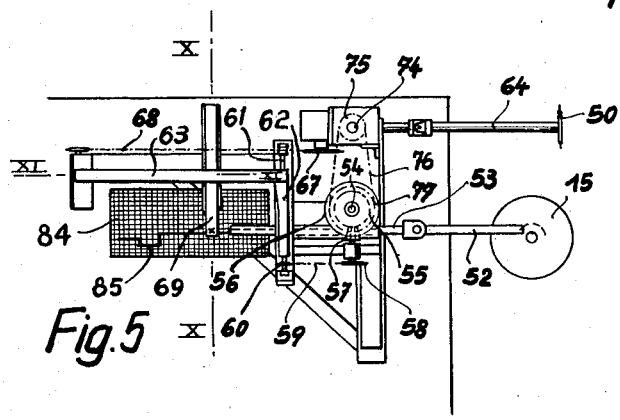
Inventor
August Saxer
By Robert E. Burns
Attorney June 10, 1958         A. SAXER         2,837,943
CONTROL FOR TWO ORTHOGONAL FEED MOVEMENTS
Filed March 18, 1952         7 Sheets–Sheet 6
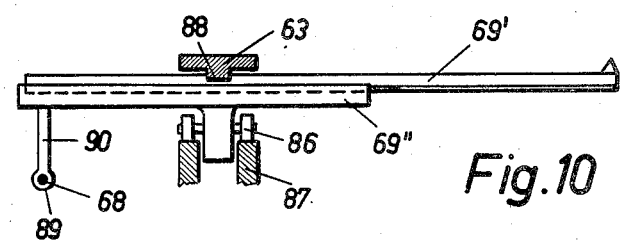
*Fig.10*
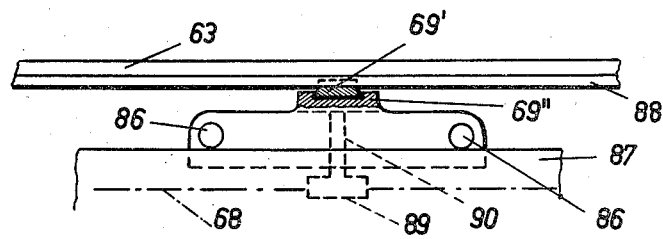
*Fig.11*
*Fig.13*
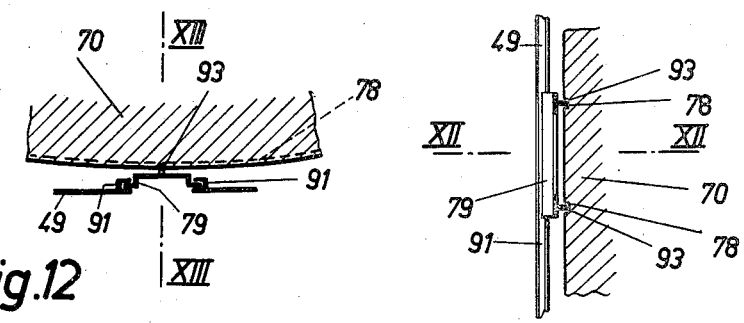
*Fig.12*
INVENTOR
AUGUST SAXER
BY
ATTORNEY June 10, 1958   A. SAXER   2,837,943
CONTROL FOR TWO ORTHOGONAL FEED MOVEMENTS
Filed March 18, 1952   7 Sheets-Sheet 7
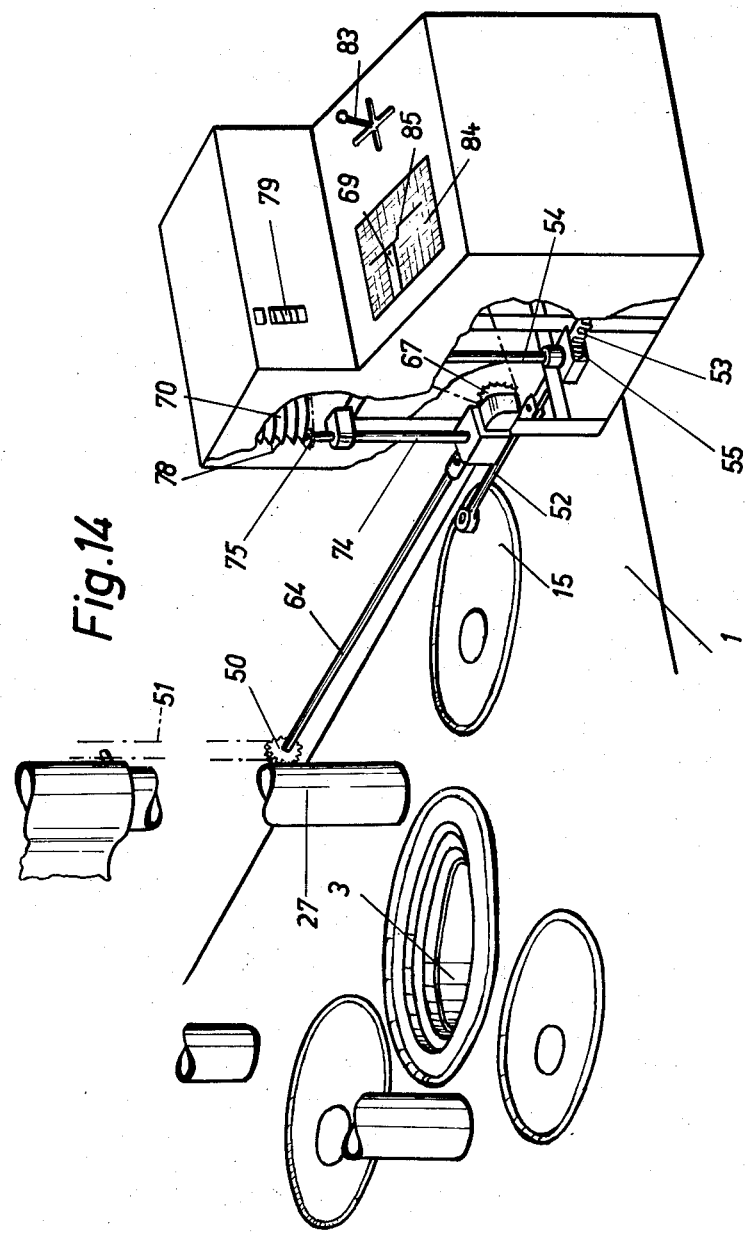
INVENTOR
AUGUST SAXER
BY
ATTORNEY United States Patent Office 2,837,943
Patented June 10, 1958

2,837,943

CONTROL FOR TWO ORTHOGONAL FEED MOVEMENTS

August Saxer, Thalwil, Switzerland

Application March 18, 1952, Serial No. 277,130

Claims priority, application Austria March 21, 1951

2 Claims. (Cl. 78—20)

This invention relates to the control of two orthogonal feed movements of a machine for shaping a workpiece and will be described hereinafter with particular reference to a machine for forging axial-symmetrical workpieces, in which machine hammer-like impact tools distributed around the periphery of the workpiece effect the deformation of the workpiece, which is being moved axially and, if desired, rotated, said impact tools being jointly adjustable to the respective cross-sectional dimensions of the workpiece. For forming workpieces differing from the pure bar shape, it has been necessary previously to provide these machines with a special control mechanism to correlate the workpiece feed and the setting of the tool penetration, e. g., by means of templates, stops, or the like, because it is imposible to read and check the achieved cross-sectional and length dimensions of the workpiece during the operation of the machine. Automatic control, which requires for each shape of the workpiece to be forged a separate template or a complicated adjustment of the stops, however, is profitable only for the manufacture of larger series of equal workpieces and loses its usefulness in the manufacture of single or smaller numbers of differently shaped workpieces.

The invention provides a forging machine which permits of a continuous control of the axial workpiece motion and the hammer setting, which together determine the shape of the workpiece, and thus permits of reading the workpiece dimensions obtained at a time. Thereby it enables an arbitrary control according to the desired final shape of the workpiece, i. e., forging with reference to a drawing, and is suitable in particular also for the manufacture of large workpieces.

Essentially the invention resides in that the motion of setting the hammer tools and the axial motion of the workpiece effected by means of a gripping head guided along the machine frame, may be controlled independently or individually, but to the exclusion of the respective other motion, and transmitted with a corresponding transmission ratio to an indicating device. Being adapted to show continuously the progress of both motions, i. e., the progress of the deformation of the workpiece as such, this indicating device is the requirement for a free individual control of the two motions and thus enables the forging of workpieces of any shape independently of a pre-adjustment and of the operation of an automatic system. The two motions may be controlled independently of one another, i. e., also simultaneously, e. g., in the manufacture of conical or curved forms. To simplify the operation and facilitate the reading, with an eventual influence also on the possible accuracy of forging, it is desirable, however, to construct the machine so that the two motions may be performed and controlled only successively but not simultaneously.

Thus it is a feature of the invention to provide in a control system for two orthogonal feed movements of a machine for shaping a workpiece the combination of adjusting means operable to perform one of said movements, adjusting means operable to perform the other of said movements, an indicator movable in two different directions, means positively connecting said indicator to both said adjusting means to adjust the indicator in one of said directions in dependence on one of said feed movements and in the other of said directions in dependence on the other of said feed movements, and a manually controllable motion transmitter operatively connected to one of said adjusting means for thus operating the same and operatively disconnected from the other of said adjusting means.

In further development of the invention the setting movement of the hammer tools and the axial movement of the workpiece and gripping head may be transmitted as coordinated linear movements normal to each other to a common pointer of the indicating device. This enables forging directly with reference to the drawing because the pointer follows both motions, which thus need only to be controlled so that the pointer follows the contour of the drawing. Such drawings must allow for the elongation of the workpiece due to its forging, of course.

Thus it is another feature of the invention to provide in the process of forging axial-symmetrical workpieces, which comprises gripping a workpiece in a gripping head, moving said gripping head in the axial direction of the workpiece, and moving hammer tools distributed around the axis of the workpiece into the workpiece to form the latter, the step of controlling at least one of two adjusting means for setting the gripping head in the axial direction of the workpiece and for setting the penetration of said hammer tools, respectively, independently of the other of said adjusting means, to move an indicator operatively connected to both said adjusting means along a line corresponding to the desired contour of the workpiece.

A particularly simple structure of the machine is achieved, if separate electric motors are provided for the gripping head motion and the setting of the hammers. Preferably these motors are so controlled that the operation of one motor causes the other one to stand still. To this end a common one-lever switch, movable in two intersecting directions, is provided, in the intermediate position of which both motors are disconnected and the adjustment of which in one or the other of the intersecting directions connects one or the other motor for running in the right-hand or left-hand sense. When the handle of the one-lever switch, which may be compared, e. g., to the control column of an airplane, is moved upwardly, e. g., the gripping head will move upwardly, whereas after an oppositely directed adjustment of the switch the gripping head is lowered: the motion of the switch handle from the intermediate position to the right or left in this case causes the hammer tools to close (to reduce the cross section of the workpiece) or to open (increase of cross section) so that the machine may be controlled most simply.

To impart to the pointer the two orthogonal motions, the indicating device according to the invention has a slide bar which is associated with the motion of the gripping head or the setting motion of the hammers, and which by means of suitable transmission members may be automatically moved transversely during this motion. In accordance with the respective other motion the pointer may be adjusted automatically along said slide bar. For control purposes and for comparison with the measurements entered in the drawings, two graduated drums or the like are provided, moreover, which in accordance with the two motions may be adjusted automatically with the pointer and indicate the dimension of the workpiece motion and of the hammer setting, i. e., the forged length and cross section obtained at a time. Since in machines for long workpieces (several meters) a conventional graduated drum would be unsuitable in view of the excessive drum diameter required, the drum intended for the length indication has the scale arranged on its periphery in a spiral line and has spiral grooves which are in engagement with a reading glass, which is guided in the casing of the indicating device in the direction of the drum axis.

Finally, to work large workpieces, for which the suggested forging machine is most suitable, the gripping head is vertically guided in the machine frame and is pivotally movable about a horizontal transverse axis. With this arrangement the glowing-hot workpieces may be transferred to the machine on a horizontal roller conveyor, from which they are taken by the lowered gripping head, turned into the horizontal position, with its gripping jaws, and are then lifted, turned into the vertical position, and fed to the hammer tools, whereas after the forging has been completed the gripping head places the workpiece on another roller conveyor for discharge. Thus the feed of the machine is simplified substantially and any separate crane or the like, which is required otherwise, is eliminated. In this case the gripping head is preferably mounted so as to be pivotally movable, and lockable in its vertical position, between the two limbs of a U-shaped carrying frame sliding along two columns and movable by means of a Gall chain or the like, a separate electric motor fixed to the carrying frame being provided for the pivotal motion.

The machine may be used for the manufacture of round workpieces if the workpiece is rotated by means of the gripping head, as well as of triangular, square or polygonal cross sections, depending on whether three, four, or more hammers are arranged and the workpiece is moved only in its axial direction.

The subject of the invention is illustrated by way of example in the accompanying drawings, Figs. 1 and 2 being a front and side elevation, respectively, showing a machine for forging large workpieces, the most essential elements being shown in partial section.

Figs. 3, 4, and 5 are side and front elevations and a top plan view, partly in section, respectively, showing as a detail the appertaining indicating device on an enlarged scale.

Being arranged below the floor, the forging box 1 has arranged therein three eccentric shafts 2 in a regular distribution around a central aperture 3 for the passage of the workpiece. The eccentric shafts 2 are driven by a motor 4 flanged to the forging box, through the intermediary of belt pulley 5, slip coupling 6, gears 7 and 8, gears 9, and crank arm 10, and intermittently operate connecting rods 11, 12, constituting carriers for exchangeable hammer tools 13, toward the workpiece, said motion from and toward the workpiece being simultaneous for all three connecting rods. The connecting rods 11, 12 are guided in corresponding radial apertures of a disk member 14, which is mounted in the forging box so as to be freely rotatable about the central axis (workpiece axis) and which follows the reciprocating motion of the connecting rods without drive.

In Figs. 6 to 9 the hammer mechanism of a forging machine for which the subject of the invention is particularly suitable is shown by way of example in enlarged views. Specifically, Fig. 6 is a sectional view of the forging table, taken on line VI—VI of Fig. 8, Fig. 7 a partly sectional view taken on line VII—VII of Fig. 8, Fig. 8 a horizontal sectional view taken on line VIII—VIII of Fig. 6, and Fig. 9 a horizontal sectional view taken on line IX—IX of Fig. 6.

Figs. 10 and 11 are two fragmentary sectional views taken along lines X—X in Fig. 3 and XI—XI in Fig. 5, respectively, and showing on an enlarged scale by way of example how a pointer of an indicating device provided according to the invention can be connected to a slide rail and a chain used for guiding and moving the pointer.

Figs. 12 and 13 are fragmentary horizontal and vertical sectional views taken along line XII—XII in Fig. 13 and in the drawing plane of Fig. 3, respectively, and showing on an enlarged scale the arrangement of a slidable reading window.

Fig. 14 is a fragmentary pictorial view of the control box, partly broken away to render the interior visible, and of its relation to the associated parts of the forging machine.

Figure 1:
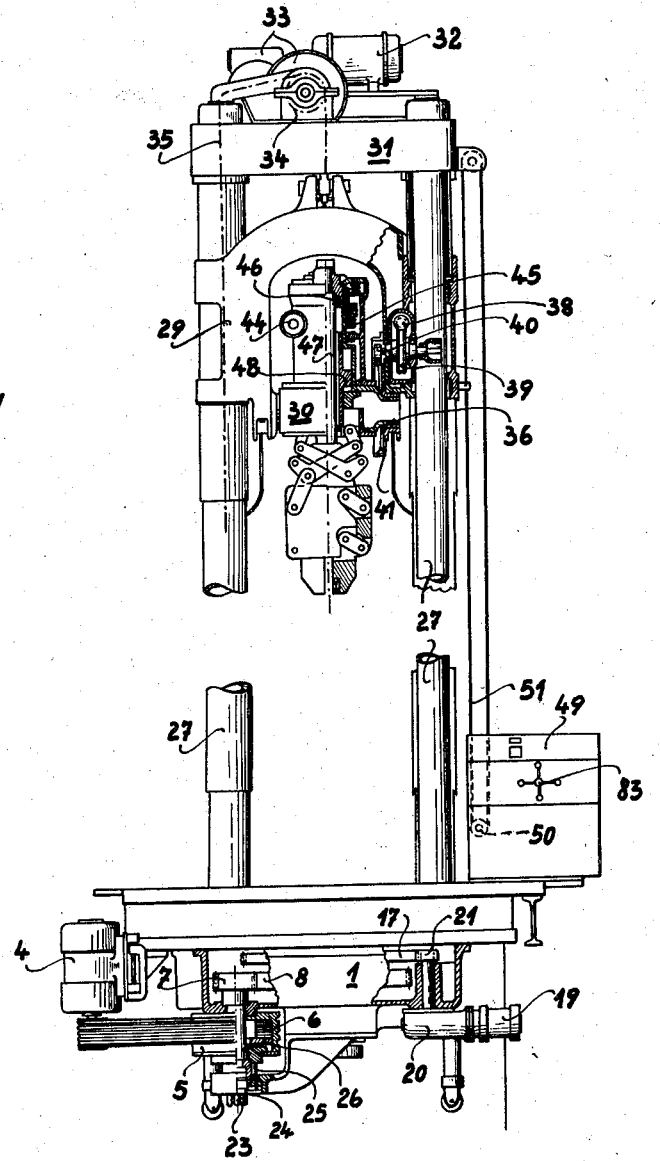
Figure 2:
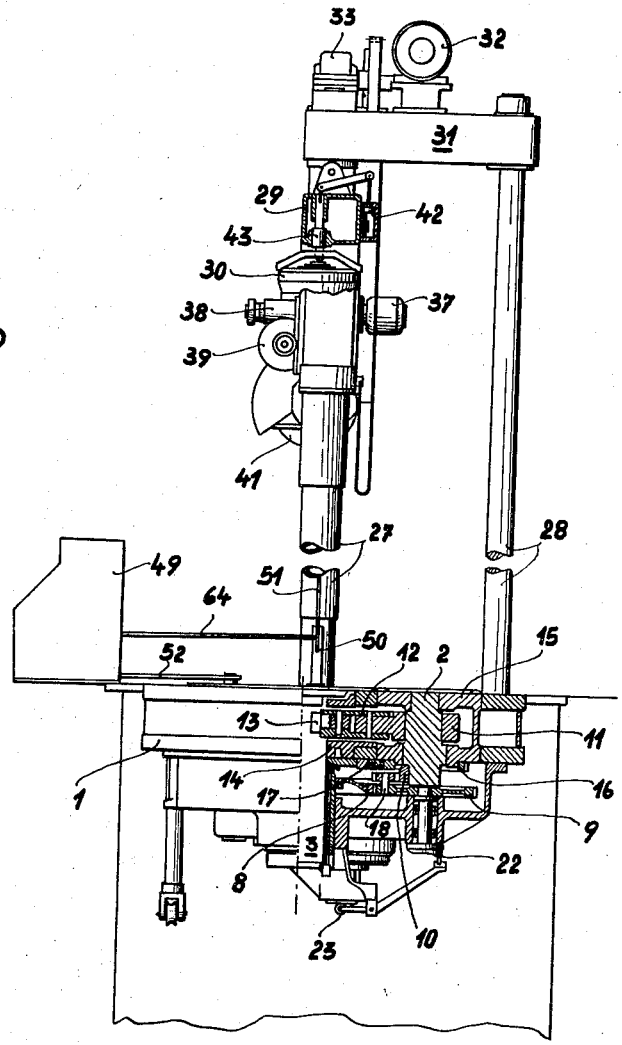
Figure 6:
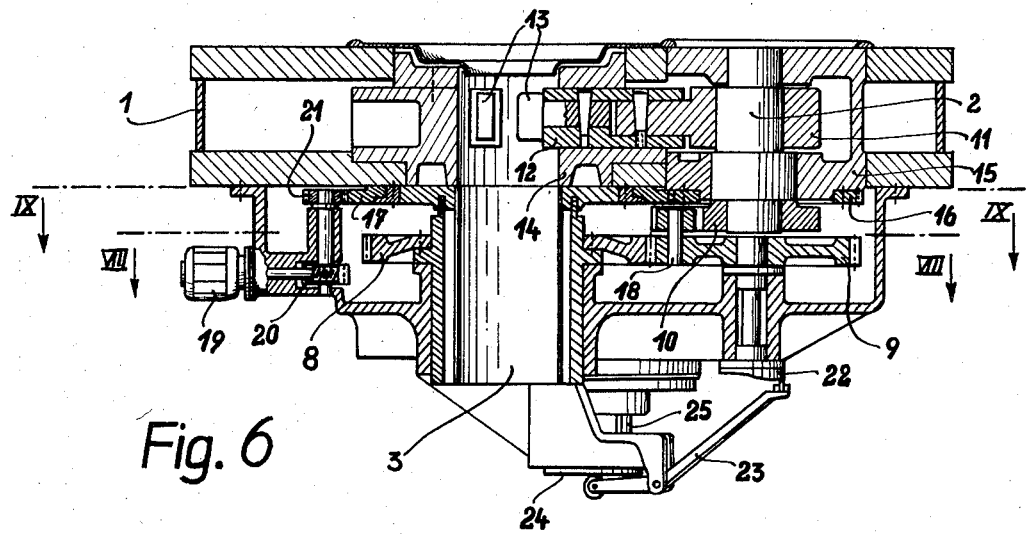
Figure 7:
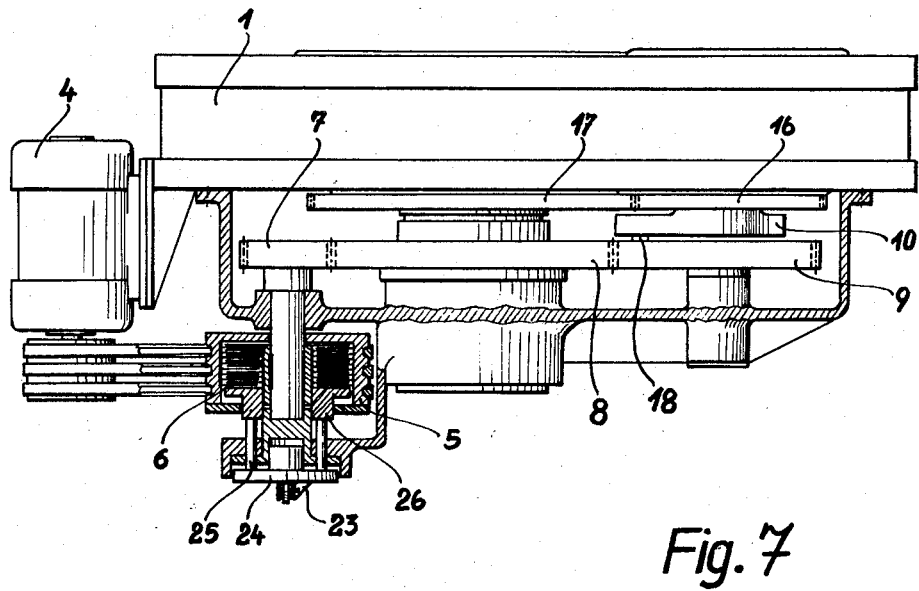
Figure 8:
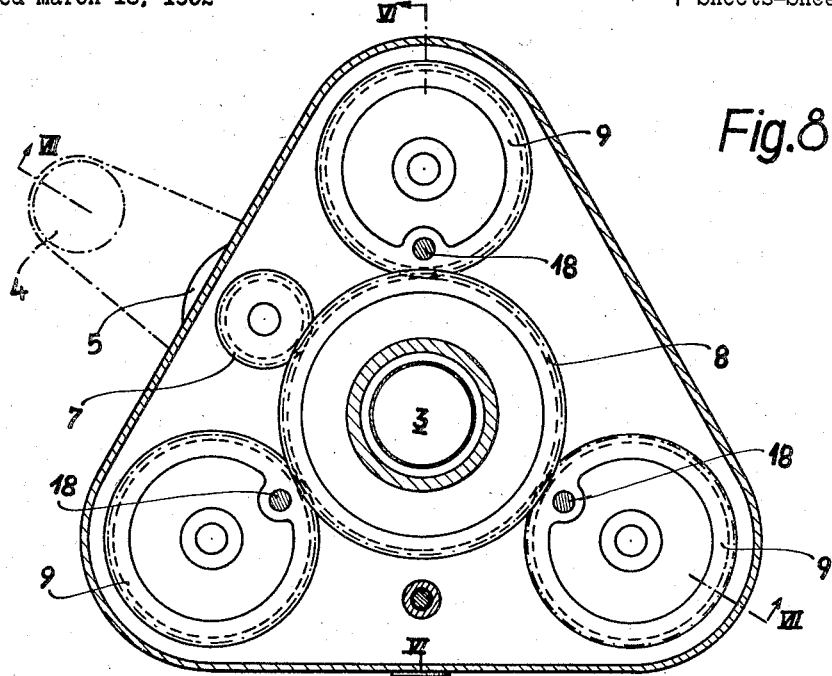
Figure 9:
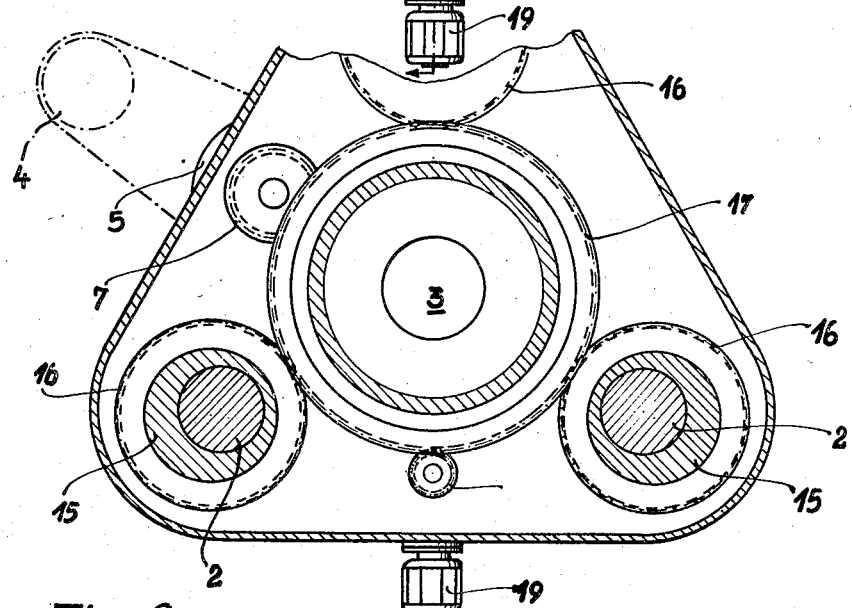

To set the tools at a depth corresponding to the respective workpiece diameter desired (or to the cross section of the workpiece), the eccentric shafts 2 are eccentrically mounted in bushings 15, which may be rotated or adjusted in the forging box by means of gears 16 connected for rotation with bushings 15, and a common central gear (or ring) 17 in mesh with gears 16. Turning of the bearing bushings 15 changes the distance of the eccentric shafts 2 from the central axis (workpiece axis) and therewith the penetration and stroke position of the tools, the resulting displacement of the axis of the crank arm 10 relative to the axis of the gear 9 being offset by the play of the coupling pin 18 in the crank arm. The depth setting of the tools, that is, the turning of the bearing bushings 15, is effected by a separate electric motor 19, which operates the central gear 17 through a corresponding gearing 20 and a pinion 21. To this end motor 19 is connected to gearing 20, which has on its output shaft the pinion 21 in mesh with gear 17.

From the above description it is apparent that the invention provides a feed control system for a forging machine in which the movement for adjusting the penetration of the forging tools into the workpiece is effected independently of the forging movement of such tools. Such machines are known per se, e. g., from my U. S. Patent No. 2,562,643, and are no subject of this invention.

In order to avoid an overstressing of the machine by excessive loads (e. g., by a workpiece which is too cold or by a hammer feed which is too fast), the hammer drive means comprises the interposed slip coupling 6, which can cause the standstill of the hammers within the shortest time. However, since in a crank or eccentric the forces to be transmitted vary greatly during one turn, the force transmitted through the coupling must vary in the same rhythm. This means that the frictional resistance of the coupling must be increased or reduced. To this end the shaft of a drive gear 9 for one of the eccentric shafts 2 has mounted thereon a cam 22, which operates a lever 23, which through the intermediary of a disk 24, slide bolt 25, and annular disk 26 more or less compresses the disks of the coupling.

A plate 31, carrying a motor 32 for the motion of the carrying frame and gripping head, rests on two columns 27, 28, of which the two front columns 27 serve as guides for a U-shaped carrying frame 29 for a gripping head 30, and are surrounded by telescope-like sleeves to protect their slideways. Through a gearing 33 the motor 32 drives a sprocket wheel 34, around which is passed a Gall chain 35, from which the carrying frame 29 is suspended. The free end of the chain is accommodated in one of the guide columns 27.

The gripping head 30 is pivotally mounted by means of a horizontal hollow pin 36 in the carrying frame 29, and by means of a motor 37, flanged to the carrying frame, and through the intermediary of a worm 38, worm wheel 39, and gears 40 and 41, may be turned from its normal vertical position to grip or deposit the workpieces, which are supplied and discharged horizontally. A locking bolt 43, liftable by a pneumatic piston 42 and automatically clicking under spring force, secures the gripping head in its normal position. A separate motor (not visible) for rotating the workpiece is flanged to the gripping head and through the worm 44, worm wheel 45, and coupling 46 rotates a gripping jaw carrier 47. The gripping jaws are opened and closed pneumatically by means of a piston 48.

To transmit the vertical gripping head movement (axial movement of workpiece) to the indicating device 49, a chain 51 extending parallel to one of the guide columns 27 and passed from below around a sprocket wheel 50 is connected to the carrying frame 29 and when the latter is moved turns the sprocket wheel 50 correspondingly. To transmit the depth setting or setting movement of the hammer tools to the indicating device, one of the rotatable bearing bushings 15 of the eccentric shafts 2 has linked thereto a connecting rod 52, which is connected to and moves a rack 53 to an extent corresponding to the adjustment of the hammers.

The indicating device has mounted therein a vertical shaft 54, on which a pinion 55 is mounted near its lower end which engages with the rack 53 and is turned when the latter is moved. Through a pair of meshing bevel gears 56, 57, sprocket wheel 58, chain 59, and sprocket wheel 60 this rotation is transmitted to a horizontal screw spindle 61 and is thus converted into a transverse displacement of a slide bar 63, which is rigidly connected to a travelling nut 62 arranged on the screw spindle. To this end bevel gear 56 is mounted on shaft 54 whereas bevel gear 57 is connected for rotation with sprocket wheel 58 and chain 59 passes around sprocket wheels 58 and 60. The latter is mounted on spindle 61. The rotation of the sprocket wheel 50 in correspondence with the vertical motion of the gripping head is transmitted through a shaft 64 carrying sprocket wheel 50, a pair of meshing bevel gears 65, 66, and a sprocket wheel 67, to a chain 68 extending parallel to the slide bar and around sprocket wheel 67. To this end bevel gear 65 is mounted on shaft 64 and bevel gear 66 is connected for rotation with sprocket wheel 67. A pointer 69 is longitudinally but not transversely displaceable on the slide bar 63, and is connected to the chain 68 to be movable transversely but not longitudinally thereby. Thus, upon adjustment of the hammers (alteration of cross section of workpiece) the pointer will be moved with the slide bar 63 parallel to the screw spindle 61, and upon axial movement (determining the forging length) it will be moved normal to the bar 63 (parallel to chain 68) and will actually follow a line corresponding true to scale to the resulting contour of the workpiece. When a drawing 84 (Fig. 5) of the desired shape of the workpiece, to the correct scale, is laid or otherwise applied in a correct arrangement on or above the surface swept by the pointer, it is sufficient to control the two motors 19 and 32 so that the pointer follows accurately the contour 85 on the drawing. With a suitable optical device the pointer may be projected on an indicating device, of course.

The construction and arrangement of the pointer 69 is illustrated more particularly in Figs. 10 and 11, which show the pointer to comprise an upper part 69' and a lower part 69'', which is guided by means of rollers 86 on stationary guideways 87 in the casing 49a. The upper part 69' of the pointer is dovetailed in the lower part 69'' so as to be longitudinally slidable therein. To enable the upper part 69' to be moved by the slide rail 63, the latter has on its underside a rib 88 which is received in a mating recess of the upper part 69' of the pointer. Thus the indicating free end of the lower part of the pointer will move in the longitudinal direction of the upper part 69' upon a transverse displacement of the slide rail 63, whereas it will be moved transversely upon a movement of the chain 68 connected to the lower part 69'' of the pointer by a sleeve 89 through which the chain 68 is threaded and which grips the latter and is rigidly connected to the lower part 69'' of the pointer by a stemlike part 90 which may be affixed to or integral with the sleeve 89.

To control the dimensions of the workpiece achieved at a time, the indicating device is provided with two graduated drums 70, 71. The drum 70 for indicating the length (associated with the gripping head movement) is freely rotatable on the vertical shaft 54 and will be adjusted through a pair of bevel gears 72, 73, shaft 74, sprocket wheel 75, chain 76, and sprocket wheel 77 when the shaft 64 and the sprocket wheel 50 are turned. Owing to the necessary length of the scale the same is entered as a spiral on the periphery of the drum, which has spiral grooves 78, which are in engagement with a reading window 79, which is displaceable parallel to the drum axis in the casing 49a of the indicating device.

The construction and arrangement of this reading window 79 is shown particularly in Figs. 12 and 13. The casing 49a has a vertical slot limited by lateral guide strips 91, which are formed to receive and guide offset side portions 92 of the window 79. The window 79 is formed on its rear side near its upper and lower ends with small projections 93, which are received in the spiral grooves 78 of the drum 70. Thus a rotation of the drum 70 will cause the window 79 to move up or down along the guide strips 91 owing to the lead of the grooves 78.

The graduated drum 71 for indicating the diameter (or cross section of the workpiece) is turned by the shaft 54 through a chain drive 80, 81, 82, and moves behind a stationary reading window of the casing.

Beside the indicating surface the indicating device has built into it a one-lever switch 83, which controls both motors 19 and 32 and has a handle operable in two intersecting directions. In its intermediate position both motors are disconnected. When the switch handle is in its upper or lower position only the motor 32 is running in one or the other sense (lifting or lowering of gripping head); in the right- or left-hand position of the switch the motor 19 is connected for running in the right- and left-hand sense, respectively, and the hammers open or close, whereas the motor 32 is at a standstill.

To forge an elongated workpiece, the handle of the switch 83 is moved to its upper position until the gripping head 30 is sufficiently spaced above the forging box 1 to enable the workpiece to be clamped in the gripping head 30. After the workpiece has been clamped in the head 30 the handle of switch 83 is shifted first to the left until the hammers 13 are completely closed, and then to its lower position to lower the workpiece until it rests on the hammers. Now a drawing showing in longitudinal section the shape to which the workpiece is to be forged is affixed on the inclined top of the indicating device 49 in such a position that the center line of the drawing is parallel to the slide bar 63 and the pointer 69 is at the top end of the center line. Then the handle of switch 83 is pulled to the right to open the hammers sufficiently to enable the workpiece to be fed between the hammers. Thereafter the handle of switch 83 is shifted to its lower position until the position of the pointer 69 on the drawing indicates that the workpiece has been introduced between the hammers to such a depth that its lower end does not protrude below the hammers. The motor 4 is now started to cause the hammers to forge the workpiece. While the workpiece is being forged the handle of switch 83 is shifted to the left until the slide bar 63 has been displaced to move the pointer 69 exactly to the line which represents the contour of the workpiece on the drawing. Thereafter the handle of the switch 83 is shifted to its lower position until the pointer 69 indicates that the next adjacent length portion of the workpiece has been introduced between the hammers. If this portion is to be forged to a cross-section different from that of the preceding portion the handle of the switch 83 is shifted to the left or right until the pointer 69 has again reached the line indicating the contour of the workpiece on the drawing. Unless the motor 4 for the forging movement is deenergized and the hammers are completely opened for the feed movement of the workpiece, the setting of the depth of the hammers is to be effected before the introduction of the corresponding length portion of the workpiece between the hammers if this length portion is to be forged to a larger cross-section than the preceding length portion, and after the introduction of the corresponding length portion between the hammers if this length portion is to be forged to a smaller cross-section than the preceding length portion.

To forge also conical shapes, when it is necessary to move the workpiece axially and to set the hammers at the same time, the arrangement might desirably be such that one of the motions may proceed continuously and only the other one needs to be controlled arbitrarily. When the rotation of the workpiece is discontinued, triangular or polygonal workpieces may be manufactured, depending on the arrangement of the hammers.

I claim:

1. In a control system for two orthogonal feed movements of a machine for shaping a workpiece, the combination of adjusting means operable to perform one of said movements, adjusting means operable to perform the other of said movements, a pointer, a slide bar in engagement with the pointer and guiding it in a first direction, means in engagement with the slide bar and guiding it in a second direction orthogonal to said first one, means positively connecting one of said adjusting means to said pointer for moving the latter in said first direction in dependence on the feed movement of said adjusting means, means positively connecting the other of said adjusting means to said slide bar to move it in said second direction in dependence on the feed movement of said other adjusting means, and a manually controllable motion transmitter operatively connected to one, and only one, of said adjusting means for thus operating the same.

2. In a control system for two orthogonal feed movements of a machine for shaping a workpiece, which feed movements are of different length, the combination of first adjusting means operable to perform the longer of said feed movements, second adjusting means operable to perform the other of said feed movements, a pointer, means guiding the pointer in two orthogonal directions, means positively connecting said pointer to both said adjusting means to adjust the pointer in one of said orthogonal directions in dependence on one of said feed movements and in the other of said orthogonal directions in dependence on the other of said feed movements, a casing accommodating a graduated rotary drum which has on its periphery a spiral scale and spiral grooves, means positively connecting said pointer to said graduated drum to rotate the latter in dependence on the longer of said feed movements, reference means consisting of a reading window guided along said casing in the axial direction of said drum and in engagement with said grooves to indicate the position of said first adjusting means, and a manually controllable motion transmitter operatively connected to one, and only one, of said adjusting means for thus operating the same.

References Cited in the file of this patent
UNITED STATES PATENTS

| | | |
|---|---|---|
| 1,511,540 | Thomas | Oct. 14, 1924 |
| 2,076,865 | Romaine | Apr. 13, 1937 |
| 2,203,389 | Kurtz | June 4, 1940 |
| 2,293,175 | Ruhl et al. | Aug. 18, 1942 |
| 2,410,742 | Newall | Nov. 5, 1946 |
| 2,562,643 | Saxer | July 31, 1951 |
| 2,723,598 | Mann | Nov. 15, 1955 |

FOREIGN PATENTS

| | | |
|---|---|---|
| 647,122 | Great Britain | Dec. 6, 1950 |